(No Model.)
R. T. MOSS.
HALTER.
No. 367,831. Patented Aug. 9, 1887.
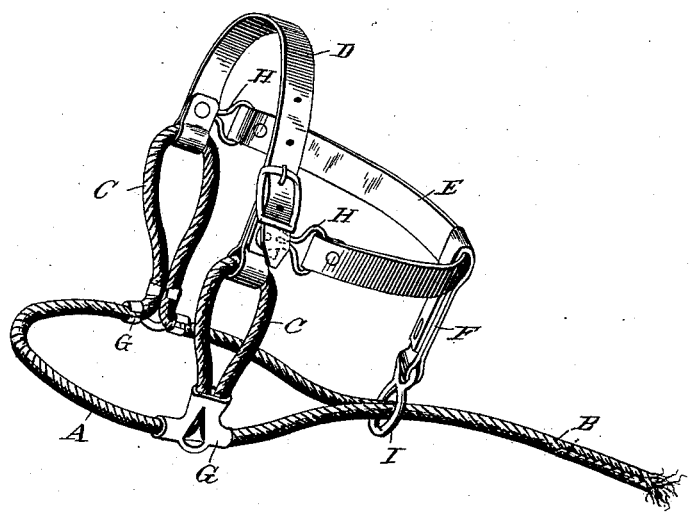
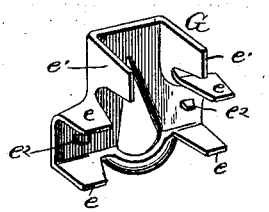
WITNESSES:
INVENTOR
Robert T. Moss
BY R. S. & A. P. Lacey,
ATTORNEYS.

UNITED STATES PATENT OFFICE.

ROBERT T. MOSS, OF CAMBRIDGE, OHIO.

HALTER.

SPECIFICATION forming part of Letters Patent No. 367,831, dated August 9, 1887.

Application filed June 27, 1887. Serial No. 242,652. (No model.)

*To all whom it may concern:*

Be it known that I, ROBERT T. MOSS, a citizen of the United States, residing at Cambridge, in the county of Guernsey and State of Ohio, have invented certain new and useful Improvements in Halters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to halters, and has for its object the production of a simple, compact, and economical device for tethering and checking fractious animals, and which can be quickly and conveniently applied, and will be durable and efficient in use.

The improvement consists in the novel features hereinafter more fully described, claimed, and shown in the annexed drawings, in which—

Figure 1 is a perspective view of a halter embodying my invention, and Fig. 2 a detail perspective view of the clip which binds the nose-check and chin or side pieces.

The halter is composed of the nose check A, tether B, cheek or side pieces, C, crown-strap D, composed of two parts buckled together, throat-strap E, shank F, and suitable devices, as the clip G, for covering the nose-check and cheek-pieces, loops H, connecting the throat and crown-straps, and the loop I, fastened to the lower end of shank F and having the tether or nose-check passing loosely therethrough.

The tether, nose-check, and cheek-pieces are composed of a single piece of suitable material, rope being preferable. The cheek-pieces are formed by loops in the nose-check, and the lower ends of the loops are held together by clips, composed of a T-shaped plate having arms $e$ projecting from the edges of the lateral branches and arms $e'$ extending from the edges of the main stem. The ends of the loops fit between the arms $e'$, and the intercepted ends of the nose-check fit between the arms $e$. The several ends are held together by bending the respective arms down upon and over them. The nose-check is prevented from enlarging by the intercepted ends pulling through or between the arms $e$ by the interlocking projections $e^2$, extending from the plate between the arms $e$ and biting or penetrating into said ends.

The crown-strap is made of two parts, adapted to be buckled together when placed on the animal and unbuckled when removing and adjusting it. The ends of the two parts are looped around the side pieces and are riveted together, and these rivets also secure the loops H in position.

Having thus described my invention, what I claim, and desire to secure by Letters Patent, is—

1. The herein shown and described halter, composed of the tether, the nose-check, and the cheek-pieces, formed of a single piece, the clips binding the ends of the loops forming the cheek-pieces together, the crown-strap made of two parts and adapted to be buckled together, the throat-strap, the loops uniting the throat and crown straps, the shank, and the loop depending from the shank and having the tether and nose-check adapted to pass loosely therethrough, substantially as set forth.

2. In a halter, the combination, with the nose-check having loops formed therein providing cheek-pieces, of the T-shaped clips having arms extending from the edges of the main stem and lateral branches, which arms are bent about and clamp the ends of the loops and the ends of the nose-check, substantially as set forth.

3. The combination, with the nose-check having loops forming cheek-pieces, of the T-shaped clips having arms extending from the edges of its main stem and lateral branches, which are bent around the ends of the loops and nose-check, and interlocking projections extending between the arms for penetrating said ends and preventing their slipping, substantially as specified.

In testimony whereof I affix my signature in presence of two witnesses.

ROBERT T. MOSS.

Witnesses:
JOHN V. FERGUSON,
JOHN P. MCCLELLAND.